United States Patent [19]

Marshall et al.

[11] Patent Number: 4,933,307

[45] Date of Patent: Jun. 12, 1990

[54] SILICA-RICH POROUS SUBSTRATES WITH REDUCED TENDENCIES FOR BREAKING OR CRACKING

[75] Inventors: William P. Marshall; Joseph J. Hammel, both of Pittsburgh; Herbert W. Barch, Natrona Heights; Roy D. Hegedus, Millvale; Walter J. Robertson, Aspinwall, all of Pa.

[73] Assignee: PPG Industries, Inc., Pittsburgh, Pa.

[21] Appl. No.: 184,304

[22] Filed: Apr. 21, 1988

[51] Int. Cl.$^5$ .................. C03C 11/00; C03C 12/00; C03C 13/02

[52] U.S. Cl. ................................. 501/39; 501/33; 501/35; 501/54; 501/55; 501/59; 501/63; 501/64; 501/65; 501/66; 501/67; 501/68; 501/69; 501/70; 501/71; 501/72; 65/31

[58] Field of Search .................... 501/33, 35, 39, 54, 501/55, 59, 63, 64, 65, 66, 67, 68, 69, 70, 71, 72; 65/31

[56] References Cited

U.S. PATENT DOCUMENTS

| | | | |
|---|---|---|---|
| 2,106,744 | 2/1938 | Hood et al. | 501/65 |
| 2,215,039 | 9/1940 | Hood et al. | 501/65 |
| 2,221,709 | 11/1940 | Hood et al. | 501/66 |
| 2,286,275 | 6/1942 | Hood et al. | 501/65 |
| 2,494,259 | 1/1950 | Nordberg | 501/35 |
| 2,843,461 | 7/1958 | Labino | 65/3.1 |
| 3,630,700 | 12/1971 | Hammel et al. | 65/21.4 |
| 3,843,341 | 10/1974 | Hammel et al. | 501/33 |
| 3,923,533 | 12/1975 | Hammel et al. | 501/33 |
| 3,923,688 | 12/1975 | Hammel et al. | 501/80 |
| 3,972,721 | 8/1976 | Hammel et al. | 501/33 |
| 4,042,359 | 8/1977 | Schnabel et al. | 65/2 |
| 4,063,001 | 12/1977 | Zlochower | 501/35 |
| 4,110,096 | 8/1978 | Macedo et al. | 65/3.1 |
| 4,778,499 | 10/1988 | Beaver | 501/54 |

FOREIGN PATENT DOCUMENTS

| | | | |
|---|---|---|---|
| 0160232 | 4/1985 | European Pat. Off. | |
| 0186128 | 7/1986 | European Pat. Off. | 501/35 |
| 1421938 | 8/1961 | Fed. Rep. of Germany | |
| 2096375 | 12/1969 | France | |
| 1066257 | 11/1964 | United Kingdom | |

OTHER PUBLICATIONS

Article: "Solubility of Silica in Nitric Acid Solutions", by Thomas H. Elmer and Martin E. Nordberg in Journal of the American Ceramic Society, vol. 41, No. 12 (1958), pp. 517-520.

Article: "Leaching of E-Glass", by Thomas H. Elmer, Journal of the American Ceramic Society, vol. 67, No. 12, Dec. 1984, pp. 778-782.

Article: "Leach-Out Process of Phase Separated Sodium Borosilicate Glass", by Masaru Shimbo, Journal Yogyo-Kyokai-Shi 80(7) 1972, pp. 277-284.

"Stress in Leached Phase-Separated Glass", George W. Scherer et al., Journal of the American Ceramic Society, vol. 68, No. 8, Aug. 1985, pp. 419-426.

*Primary Examiner*—Mark L. Bell
*Assistant Examiner*—Anthony J. Green
*Attorney, Agent, or Firm*—Kenneth J. Stachel

[57] ABSTRACT

Porous, silica-rich shapes have improved strength and abrasion resistance by leaching the precursor glass shape in preconditioned acid having silica ion and at least one common ion that is also present in the precursor glass shape. The precursor glass shapes have shapes such as fibers, hollow fibers, tubes, rods, beads, hollow spheres and plates and compositions having 30–75 volume percent silica and at least 10–65 volume percent nonsiliceous acid extractable components. Preconditioning of the acid solution results from a pretreatment of the acid with compounds that dissociate into the ions when added to the acid solution or with shapes, particles or fragments of glass compositions different from or similar to the glass shape to be leached so long as the glass composition has extractable material to provide the silica ion and at least one common ion.

27 Claims, 1 Drawing Sheet

FIG. 1

SILICA-RICH POROUS SUBSTRATES WITH REDUCED TENDENCIES FOR BREAKING OR CRACKING

The present invention is directed to a process and product where the process involves controlled leaching of glass substrates to produce a silica-rich porous substrate having improved strength through a reduced tendency for breaking and cracking.

Recently porous, inorganic membranes have become of interest in commerce and industry for use in various applications. The porosity in such inorganic substrates or membranes occurs typically from leaching a glass form with water and/or acid and/or alkaline material depending upon the composition of the glass being leached to extract leachable components to varying degrees. This removal deleteriously affects the strengths of the porous product as compared to the original glass form. This is particularly the situation when the original form is an elongated thin form such as a fiber or hollow fiber. The art has attempted to address the reduction in strength of porous substrates or membranes by certain modified leaching techniques. For instance, the art has suggested in acid leaching to have dissolved silica present in the acid. Also, the art has suggested in water leaching to have dissolved borate present and in leaching with acid to have present sodium or potassium or ammonium chloride or equivalent compounds that reduce the water concentration in the acid to thereby reduce swelling or cracking of the glass form. Another approach of the art includes the presence of metals or metallic salts in the leaching acid.

It is an object of the present invention to produce porous, silica-rich substrates with improved strength through reducing the tendency for such substrates to break or crack.

Summary of the Invention

The present invention embodies porous, silica-rich shapes and a process for producing the shapes and a process for leaching glass shapes.

The porous, silica-rich shapes are comprised of an amount of silica in the range of at least 70 weight percent and minor amounts of unextracted nonsiliceous components. The shapes include: beads, hollow spheres, plates, fibers, hollow fibers, rods and tubes and generally have an outer diameter in the range from around 3 microns to around 5 millimeters, and have lengths varying from short or long chopped fibers of around less than 1 inch to 36 inches to near continuous fibrous, tubular, or rod-like shapes. Also, the porous shapes have a pore volume in the range of around 0.15 to about 1.5 cc per gram and pore diameters in the range of around 1 to several hundred angstroms. The silica-rich porous shapes are formed with glass compositions having at least from around 30 to 80 weight percent silica and from around at least 15 to 65 volume percent of nonsiliceous acid or water extractable components. Glass forms or precursors with the such compositions are acid leached with acids other than hydrofluoric acid where the acid is preconditioned to contain silica and at least one additional ion that is common to a cation or ion complex in the glass composition of the precursor to be leached and that is present in quantities greater than trace amounts. These ions are hereinafter referred to as "common ions". The forms of hollow or solid fibers, tubes, rods, capillaries, beads (hollow or solid) and the like of the so-called precursor glass translate into similar shapes for the silica-rich shape after leaching with the that is other than hydrofluoric acid. The silica-rich shapes differ from the glass precursor in that the former are porous after leaching. The glass compositions include those having silica and/or one or more other glass forming oxides and/or modifiers, some of which are extractable by acids other than hydrofluoric acid. Although they may be extractable by hydrofluoric acid, hydrofluoric acid is not used since it also extracts silica. The preconditioning of the acid with the silica and at least one other common ion can occur by preleaching glass articles or by the addition of common ion forming compounds. Also, the common ions may exist in the preconditioned acid as free ions or complex ions or mixtures thereof. Also, the leaching with the preconditioned acid can be followed by leaching with acids preconditioned with silica and other common ions not present in the first preconditioned acid extraction, with just silica, or with the same common ions of the first preconditioned extraction along with one or more additional common ions.

It is another aspect of the present invention to have a process for producing porous, silica-rich elongated or spherical shapes by forming the general shape with a glass composition having silica present in an amount of about 30 to about 75 volume percent and an amount of acid extractables from around 15 to 65 volume percent of the shape, and leaching the glass precursor shapes with preconditioned, acid other than hydrofluoric acid and rinsing the porous, silica-rich shapes. An additional step that may be present in the process is the heat treatment of the glass precursors prior to leaching to phase separate the glass. In addition to the numerous variations for shapes and glass compositions, variations in preconditioning of the acid are also applicable to the process. These variations are those aforementioned variations for producing the porous silica-rich shapes. A third aspect of the present invention involves an improved leaching process for glass shapes where silica is present in the leaching acid. This process involves: adding a sufficient amount of an inorganic or organic base to a solution having colloidal silica to obtain an alkaline pH or starting with a silica colloid having a basic pH and diluting with water or water with a small amount of base to be slightly alkaline, and combining the alkaline, silica-containing solution with the leaching acid. In addition, this process can utilize the silica-containing leaching acid with the presence of at least one additional common ion present in any amount.

The porous, silica-rich shapes find utilization in the areas of: gas and/or liquid separation membranes, cellular or biochemical or catalytic immobilization substrates or chromatographic substrates, production of fiber optic materials, and any other applications for porous inorganic materials.

Brief Description of the Drawing

FIG. 1 illustrates the relationship between these parameters for two cases, fresh acid leaching (Curves A and A') and preconditioned acid leaching (Curves B and B').

Detailed Description of the Invention

Glass compositions usually of the borosilicate alkali metal ternary system with a fair amount of boron in the form of plates, beads (solid or hollow), fibers, tubes, rods, hollow fibers and generally other elongated shapes can be leached with acid other than hydrofluoric acid. Other such acid leachable glasses include the glass compositions having acid leachable glass components including oxides of alkali metals, alkaline earth metals and other metal oxides, for example, aluminum oxide, boron oxide, phosphorus oxides, iron oxides, zinc oxides, zirconium oxides and other oxides mentioned in the Nordberg patents, U.S. Pat. Nos. 2,461,841 and 2,494,259, which are hereby incorporated by reference. It has been discovered in acid leaching of acid leachable elongated glass shapes that high stresses can develop in the leached layer possibly due to shrinkage thereby reducing the strength of the leached product. At some point beginning somewhere around 0 and to about 25 volume percent leached, the stress is high enough to begin compressing the unleached core of the elongated shape, thereby causing the shape to shrink. The shrinkage generally relieves the stresses and when the shape is completely leached, little or no stress remains. The shrinkage may result from the increase in interfacial energy (proportional to surface area) as the ions are removed from the silica lattice of the glass precursor. Such an increased interfacial energy may have the effect of trying to lower free energy by causing the surviving holes to shrink. The shrinkage would depend on many factors, the most important being the amount of acid leachables in the glass precursor. For example, in "E-glass" the amount of leachables is in the range of 44 to 45 percent by weight.

Figure 1:
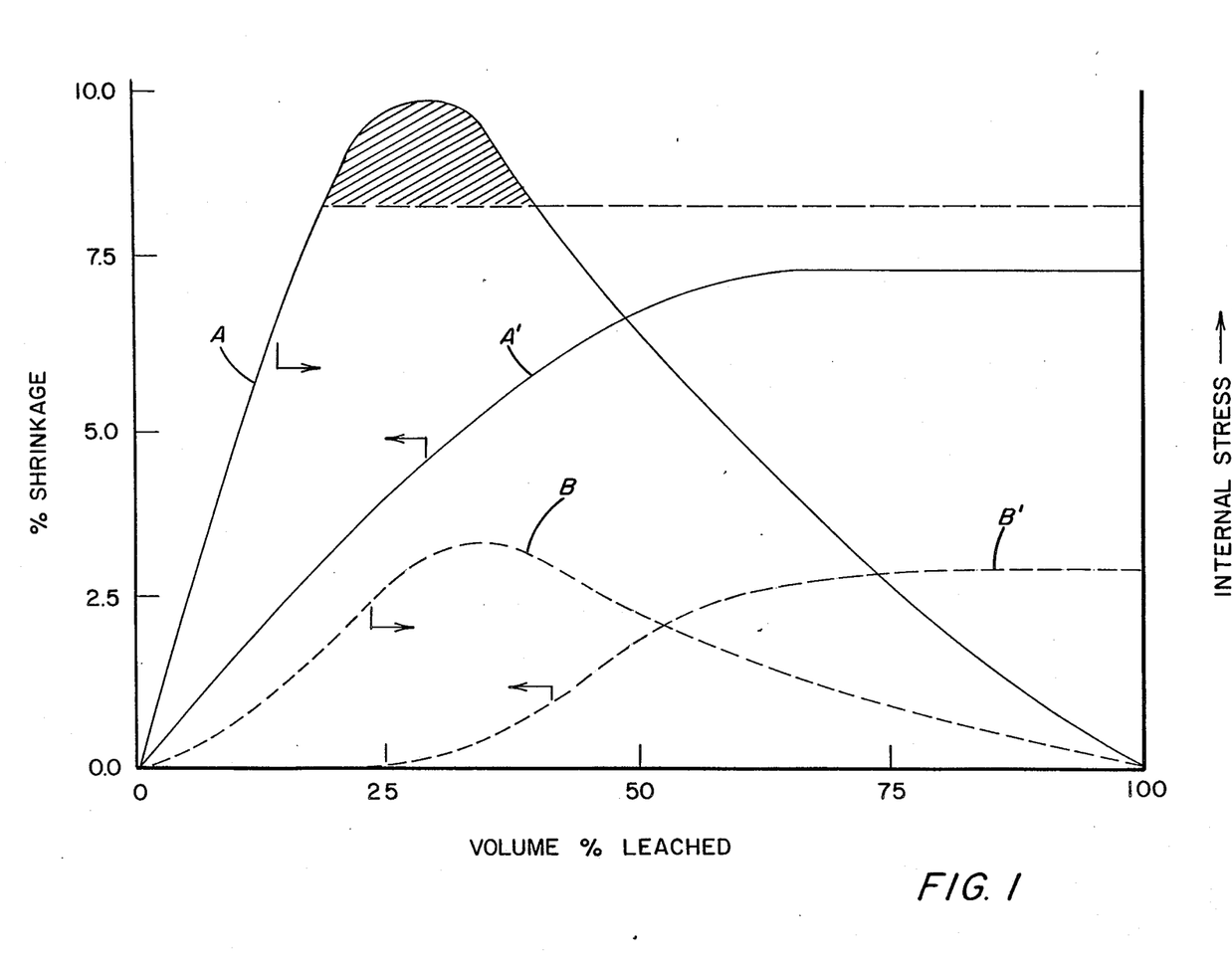
FIG. 1 is a graph of percentage shrinkage and implied (theoretical) internal stress within the fibers along the Y axes of the graph as a function of the volume percent of the bulk glass that has been leached along the X axis of the graph for glass fibers formed into porous silica-rich glass fibers through acid leaching with acids other than hydrofluoric acid.

FIG. 1 illustrates this possible relationship between fiber shrinkage and internal stress as the acid leaching proceeds. In FIG. 1 the arrows above Curves A' and B' and below Curves A and B indicate the appropriate Y-axis on the graph for the respective curves. In "case A" "E-glass" fibers are leached in fresh, three normal hydrochloric acid. In this case, shown by Curve A', there is an occurrence of a high level of shrinkage of around 7 to 9 percent, and as shown in Curve A there could be an associated large build up of internal stress. It is believed that in this case the internal stress may surpass a critical stress level above which substantial crack formation could occur that would result in the breakage of the fibers or elongated shapes. Also, FIG. 1 presents "Case B" which utilizes hydrochloric acid preconditioned by leaching 10 gm of "E-Glass" fiber in 1 liter of acid. This preconditioned acid is used for leaching additional E-glass fibers. As FIG. 1 shows in Curve B', the shrinkage of fibers leached in preconditioned acid is less than that for fibers leached in fresh acid; therefore, the stress development during leaching should stay below the critical stress value as theorized in Curve B. This would reduce the formation of cracks and impede the breakage of the elongated shapes.

For a better understanding of the present invention the term "non-phase-separated" refers to single-phase glass compositions and to phase-separable glass compositions that can be cooled rapidly enough for given fiber dimensions to prevent phase separation. The non-phase-separated glass composition includes phase-separable glass compositions that would phase-separate upon appropriate heat treatment subsequent to formation (post-formation heat treatment). Generally, non-phase-separated glass compositions are those in which the size of the composition fluctuations are less than the size of a critical nucleus of 20 angstroms. Mechanisms for describing the formation of new phases include the classical nucleation and growth mechanisms. Here, there is a sharp boundary between phases with a measurable interfacial energy and the new stable phase is defined by a critical nucleus size. For glasses, critical nucleus size has been estimated to be larger than 20 Å, as shown in "Direct Measurements of Homogeneous Nucleation Rates in a Glass-Forming System", J. J. Hammel, *Jl. Chem. Physics,* Vol. 46, No. 6, pp. 2234–2244 (1967), hereby incorporated by reference. Glasses can also phase separate by a mechanism of "Spinodal Decomposition" in which small fluctuations in composition grow rapidly when the glasses are in the spinodal region of a miscibility gap. Here, initially, there is no sharp boundary or interfacial energy between phases, and the inhomogeneities (or composition fluctuations) are points of maximum concentration of one component that gradually move to maximum concentration of the second component, e.g., $SiO_2$ to $B_2O_3$ in a borosilicate glass. This type of structure is also found above the miscibility gap where there are similar fluctuations in composition even in a single phase glass melt. Therefore, glass structure in the initial stages of spinodal decomposition cannot be distinguished from the structure of a single phase glass. Sharp boundaries with measurable interfacial energies are a necessary requirement for two-phase systems (e.g., phase separated glass). These conditions are not approached in spinodal separating systems until the phases are at least the size of a critical nucleus of around 20 Angstroms. Here, a phase refers to a region that is formed by enlarging regions originally present in the glass fibers. Even in non-phase separated glass, leaching can produce some pores with diameters greater than 20 Å because of factors such as inhomogeneities and compositional fluctuations in the glass.

For a better understanding of the invention, the term "extractable" for a group of components refers to metal oxides and associated materials which are leachable from the glass by acids other than hydrofluoric acid. Also, the term "non-extractable" for the group of components refers to silica and metal oxides of Group IVB of the Periodic Chart like zirconium dioxide ($ZrO_2$). These materials are not leachable from the glass by acids other than hydrofluoric acid. Also, the terms "associated material" refer to an interconnected structure of reaction products of the components of the extractable group or the non-extractable group or of the components from both groups because of their proximity to each other in the glass fibers. Nonexclusive examples of associated materials include alkali metal borates, alkali metal aluminates, other interaction products with aluminum oxide and the like.

Any acid leachable glass composition with an amount of silica in the range of around 30 to 75 weight percent (volume percent) is useful in forming the elongated shapes to produce the porous, silica-rich elongated shapes of the present invention. These glass compositions include those that are phase-separable by heat treatment and those that are non-phase-separable through heat treatment. Even though a glass composition is phase-separable, it need not be phase-separated through heat treatment depending upon the final use of the shape. For the non-phase-separable glasses it is preferred not to heat treat the glass fibers prior to leaching since such an action can complicate acid leaching.

The porous, silica-rich shapes of the present invention are prepared from a formulated, pore generating, glass forming batch composition. The batch composition is formulated to enable the resulting glass precursors to have at least two groups of components, i.e., the extractable including associated materials and the non-extractable. Typical batch materials known to those skilled in the art can be used and calculations by known methods can be performed to produce the glass compositions with components of the two groups.

In the pore generating glass composition, the components and associated materials of the extractable group are present in an amount of at least 15 to around 65 volume percent and include: one or more boron-containing materials; alkali metal oxides ($R_2O$); alkaline earth metal oxides like bivalent oxides (CaO, MgO); trivalent oxides like $Al_2O_3$, and $Fe_2O_3$ and oxides such as $TiO_2$, $SnO_2$, and $P_2O_5$. In addition, trace amounts of materials usually present in trace amounts in glass compositions can be present such as fluorine. The total amount of the components of the extractable group in the glass is preferably at least 30 volume percent of the total glass composition. The presence of the $R_2O$ and/or $B_2O_3$ materials also serve as fluxes in producing the glass shapes. The components of the non-extractable group include the siliceous material such as silica and any refractory glass modifiers like the tetravalent oxides of zirconium and/or titanium and/or hafnium.

When the content of boron-containing material is 0 or slightly greater than zero, the amount of alkali metal oxides ($R_2O$) can be a major component in the extractable group. When the amount of boron-containing compound is in the range of less than around 35 weight percent of the total resulting glass composition, one or more of the other aforelisted inorganic oxide components can be present in the extractable group. When the amount of boron-containing material is around 35 weight percent and up to 60 weight percent of the total resulting glass composition, the boron-containing material components constitute the majority and the other inorganic oxide components constitute the minority of the extractable group.

Regarding the other components in the glass precursor shapes that can be considered in the extractable group for phase separable and non-phase-separable glasses, the aluminum oxide can be present in an amount in the range of 0 to about 15 weight percent of glass composition. This amount is generally less for higher amounts of boron-containing materials in the glass and larger for lower amounts of boron-containing materials in the glass. The amount of $R_2O$ components range from less than one weight percent up to around 15 weight percent, when higher amounts of boron-containing components are present. Also, there can be present, especially with lower amounts of boron-containing components, calcium oxide (CaO) and magnesium oxide (MgO). The total amount of these components can be in the range of 0 to about 30 weight percent of the glass composition.

The amount of siliceous material should not be less than around 30 and preferably not less than 40 weight percent of the total glass composition. Generally, the siliceous material is less than around 80, preferably less than around 70 weight percent of the total glass composition. The metal oxides such as zirconium and/or titanium and/or hafnium can be present in amounts from around 1 to about 20 weight percent of the glass composition. When present, zirconium oxide is in an amount of up to about 12 weight percent. Since these oxides have good acid insolubility, they are present with silica in the porous shapes. These metal oxides not only render porous shapes having better alkaline stability, but also they enable substitution of the tetravalent oxides of zirconium and/or titanium and/or hafnium for one or more of the components of the extractable group. Their presence not only results in controlling porosity (by decreasing porosity without altering the amount of silica), but it also results in more alkaline stable, porous, silica-rich shapes.

Any phase-separable glass compositions (those that separate into phases upon heat treatment) within the range of the aforelisted compositions even those having little, if any, refractory glass can be used in the present invention. This includes those having high concentrations of boron-containing materials, i.e., around 5 to around 60 weight percent of the total glass composition. The hindered phase separable glass compositions (those that phase separate upon heat treatment but that contain a refractory glass modifiers) also are usable in the present invention.

The borosilicate glass compositions that are fully phase separable upon heat treatment some time before acid leaching include those pioneered by Hood and Nordberg for Corning Glass Company as described in U.S. Pat. Nos. 2,106,744; 2,215,039; 2,221,709; 2,286,275; 2,461,841 and 2,494,259 and the article entitled "Properties of Some Vycor-brand Glasses", M. E. Nordberg, Journal of the American Ceramic Society, Vol. 27, No. 10, pgs. 299–305, all of which are incorporated herein by reference. Generally, the Vycor-brand glass composition has: $B_2O_3$ in an amount of 20–35 weight percent, alkali metal oxide in an amount of 4–12 weight percent and silica in an amount of not less than 56 and not more than 75 weight percent. Also, aluminum oxide may be present is an amount of not more than around 12 weight percent.

A particularly useful heat treatable glass for phase separation formed from a shapeable glass composition has silica at 30 to 50 percent by weight, boric oxide at 40 to 55 percent by weight, alkali metal oxide at 5 to 15 percent by weight, and aluminum oxide from 0 to 4 weight percent. Nonexclusive examples of phase separable, borosilicate glasses are described in U.S. Pat. Nos. 2,106,744; 2,215,039 and 2,221,709 and 2,286,275; 3,972,720; 3,843,341 and 3,923,688, all of which are hereby incorporated by reference. Another exemplary glass composition contains boric oxide at 54 weight percent, sodium oxide at 8.0 weight percent and silica at 38 weight percent.

A particularly useful glass composition for increased porosity is a phase-separable glass having a low silica and high-borate content. Generally, these glasses have amounts in weight percent of silica at 30 to 50 percent by weight, boric oxide at 40 to 55 percent by weight, alkali metal oxide at 5 to 15 percent by weight, aluminum oxide from 0 to 4 weight percent and zirconium oxide about 1 to about 4 weight percent.

A suitable aluminum borosilicate—Group IV B metal-containing glass fiber composition for generating a lower degree of porosity is the composition such as "E-glass" or "621-glass" described in U.S. Pat. Nos. 2,334,961 and 2,571,074, respectively, but with zirconium oxide and/or titanium oxide and/or hafnium oxide. These modified compositions have in weight percent: 45–56 silica, 5–13 boric oxide, 10–17 aluminum oxide, 13–24 calcium oxide, 0 to 6 magnesium oxide, 2–6 zirconium oxide, 0 to 6 titanium oxide and/or hafnium oxide along with less than around 1 percent of both fluorine and ferric oxide and $R_2O$. The "621-glass" differs from E-glass in the presence of magnesium oxide in the former. The E-glass in the absence of magnesium oxide has an increased amount of calcium oxide. Preferably, the modified 621-glass is modified with zirconium oxide that is substituted for some aluminum oxide. A suitable composition in weight percent is: 52–56 silica, 5 to 8 boric oxide, greater than 22 to 24 calcium oxide, less than 12 aluminum oxide, 2–5 zirconium oxide with less than 1 weight percent of each of the following: fluorine, ferric oxide and sodium oxide. The extractable components can be removed from these non-phase-separated glass compositions through acid leaching without any heat treatment. Also, the standard "E-glass" and "621-glass" without the refractory glass modifier can be used.

A suitable alkali metal silica glass composition for forming shapes has around 29 weight percent sodium oxide ($Na_2O$), 62 weight percent silica ($SiO_2$), and 9 weight percent zirconium oxide ($ZrO_2$). For these types of glass compositions, the amount of alkali metal oxide $R_2O$ can range from about 20 to about 40 weight percent and the amount of metal oxide of the Group IV B metal can range from about 1 to about 20, preferably less than 12 weigh percent $ZrO_2$, with the remainder being silica.

The various glass precursor shapes or articles can be formed by any method known to those skilled in the art. Glass beads can be formed as taught in U.S. Pat. Nos. 3,630,700; 3,650,721; 3,793,061; 3,834,911; 3,843,431; 3,923,533; 3,923,688; 3,972,720; 3,792,721, all hereby incorporated by reference or any other art-recognized method of forming glass beads. In the method of preparing solid or hollow fibers, strands, capillaries and tubes, the shapeable glass precursor compositions are the attenuatable glass compositions and for the fibers they are the fiberizable compositions. These attenuated shapes can be formed by gaseous blown flame, or centrifugal or mechanical attenuation of the fibers, capillaries or tubes, or any other procedures known by those skilled in the art. Also, the fibers can be formed as hollow fibers as described in U.S. Pat. Nos. 3,268,313; 3,421,873; and 3,510,393, all of which are hereby incorporated by reference. The capillaries or tubes can be formed by any method known in the art; for instance, by the method shown in U.S. Pat. No. 4,042,359, hereby incorporated by reference. The formulation of the glass forming batch results in glass precursor shapes, wherein pores can be generated, with or without heat treatment depending on the glass composition and use of the porous silica-rich shape and with acid leaching, and with or without alkali leaching. The resultant porous silica-rich shapes have a pore volume in the range of about 0.15 to about 1.5 and preferably about 0.15 to about 1.2 cc/gm, and most preferably about 0.8 to about 1 cc/gm. The glass batch compositions are melted according to methods well known in the industry. Ordinarily, powdered raw materials such as those containing sand, boric oxide, alkali metal oxides, and optionally aluminum materials are batched and mixed and melted together. While it is preferred that the raw materials be present in forms which, when mixed and heated, most readily fuse to form a melt, the oxides may be present either in the free state or in the form of other suitable components. Examples of suitable components are alkali metal carbonates, borates and aluminates.

One particular, non-exclusive method of forming glass precursor shapes is that for forming solid or hollow fibers. A fiberizable glass batch composition is melted in a glass batch melting furnace at the requisite temperature and time for the particular glass composition. Generally, the temperature range is from about 2000° F. (1093° C.) to about 3000° F. (1649° C.) for around 1 to about 6 hours or longer. The molten glass is attenuated through bushing tips located at the bottom of the heated glass fiber forming bushing which contains the molten glass. The fibers may be cooled with air and/or water by pre-pad spray jets as they leave the bushing depending on the type of fiber being produced. For the high boron content fibers, it is preferred not to contact the fibers with water to assist in cooling the fibers. The diameter of the fibers formed from the bushings can vary from around micron range to a diameter for capillaries or tubes of around 5 mm. For the fibers, the diameters range from about 1 micron to less than around 250 microns so the fibers can be wound into a cylindrical package. The lengths of the fibers, strands, capillaries and tubes can be continuous in that their lengths can be cut into any desired lengths, which are capable of being processed further in heat treatment and leaching. Generally, the lengths of the shapes can range from about 1/32 of an inch (0.03 inch, 0.08 cm) to many feet.

The hollow glass fibers are prepared from a bushing having tubes aligned and associated with the orifices and connected to a supply of gas at a superatmospheric pressure to allow for a continuous flow of gas to the vicinity of the orifice. The flow of gas can be uniform to produce continuous glass fibers, or can be intermittent to produce intermittent hollow glass fibers. A further description of the production of hollow and intermittent glass fibers is given for a direct melt system in U.S. Pat. Nos. 3,268,313; 3,421,873 and 3,526,487, all hereby incorporated by reference. As an alternative to melting batch for feeding to the bushings, a marble melt or other type of indirect melt operation can be used.

The formed, distinct glass shapes can be treated with a fluid chemical treatment having at least one carbon-containing or carbonaceous material which is deposited on a substantial portion of the surfaces of the distinct glass shapes. The carbonaceous materials can be one or more film-forming polymers, organic/inorganic coupling or keying agents, Werner-type coupling agents, lubricants, wetting agents, emulsifiers, and the like. These materials can be in organic or aqueous solution, dispersions, emulsions, gels or foams. One nonexclusive example of a fluid chemical treatment with more than one carbonaceous material applied to siliceous fibers is U.S. Pat. No. 3,231,540 which is hereby incorporated by reference. Another example is that of U.S. Pat. No. 4,049,597 also hereby incorporated by reference.

Even though heat treatment for pore generation is not required of numerous types of precursor shaped glass compositions, the shapes with greater than about 20 weight percent boron-containing extractables are usually heat treated for phase separation. Heat treatment of these shapes brings the extractable components into interconnected phases and separates the nonextractable components into phases. This results in a greater mean pore diameter in the porous shapes. Heat treatment may occur by heating the shapes in a furnace or for fibers, tubes, rods and the like by heating on a heated drum on which they were wound. The heat treatment is usually at a temperature greater than the annealing temperature and less than the softening point temperature of the glass. The temperature of heat treatment can assist in controlling the porosity of the shapes as taught for glass in U.S. Pat. No. 3,758,284 hereby incorporated by reference. The shapes may be water leached or rinsed before they are acid leached, where the heat treatment, water leaching and acid leaching are conducted in accordance with the teachings of U.S. Pat. No. 3,843,341 hereby incorporated by reference. Glass shapes having around 20 to 35 weight percent boron oxide or anhydride can have heat treatment for phase separation followed by water and/or acid leached or merely acid leached as described in U.S. Pat. Nos. 4,042,359; 2,106,744 and 3,485,687, all hereby incorporated by reference.

Generally, the phase separable glass shapes are heat treated at a temperature in the range of about 420° C. to about 600° C. for a period of time from about 10 minutes to several days. Lower temperatures require longer times while higher temperatures may require shorter times to achieve leaching in the stated ranges. Most preferably, for the production of porous, hollow silica-rich fibers having a pore volume of around 0.7 cc/gm, the unleached fibers are heat treated at 540° C. for 6 hours to phase separate the glass into the water and/or acid leachable components and the acid insoluble components (acids other than hydrofluoric acid) of the siliceous group. For the glass fibers with higher amounts of boron-containing materials, lower heat treating temperatures or the presence of a carbonaceous material like a dried sizing composition are useful to decrease any sticking together of the glass fibers. The presence of a protective size allows utilization of higher heat treating temperatures. Afterwards, the shapes are cooled to ambient temperatures.

The leaching to generate pores can be accomplished by several routes, depending upon whether the glass composition of the shapes and the desired mean pore diameter for the porous silica-rich shape. The pores that are generated should have a diameter across some portion of the opening of the pore, whether the pore is circular, elliptical, cylindrical or asymmetrical in shape, to yield the desired mean pore diameter. The mean pore diameter of the pores can have a broad or narrow distribution. The generation of pores from the single-phase and the phase-separable but non-phase-separated glass precursors without heat treatment depends on around at least the 15 weight percent extractables being present in the glass fibers composition and for hollow fiber precursors the wall thickness is preferably less than around 50 microns.

Any of the routes for leaching can be conducted at a temperature ranging from sub-ambient to an elevated temperature up to the boiling point of the leaching acid or water at operating pressures that range from subambient to elevated. Preferably the temperature is in the range of ambient to around 95° C. The acids that are preconditioned for leaching include inorganic acids other than hydrofluoric acid that generally are highly ionized in water and have no ionization constant or are those having ionizations constants less than $0.5 \times 10^{-3}$. Also, organic acids having similar ionization constants can be used. The concentrations of the acids can be in the range of around 0.001 Normal to around 12 Normal for an acid having a pKa similar to hydrochloric acid. Acids with lower pKa's can be used in more dilute solutions and acids with higher pKa's can be used in higher concentrations. In acid leaching, the leaching solution is preconditioned to have silica ions and in greater than trace amounts at least one other ion of an element that is present in the glass that is leached (common ion). The ions are generally metallic cations or complexes of ions even those including silica and oxygen. The time of leaching depends on the composition, the temperature of leaching, and the concentration of the acid. Generally, the time is as short as around 5 minutes for the acid leaching of glass precursors with high concentrations of boron-containing extractables. The time is also as long as around 24 hours to a month or longer for the "E-glass" or "621-glass" compositions. Maintenance of the concentration of the acid in a low acid pH range may assist in providing favorable leaching kinetics to result in a complete or near complete leaching reaction. Also, it is preferred in leaching of hollow glass fibers to seal the ends of the fibers with an acid resistant polymer. This permits leaching only from the exterior surface of one or more fibers. This is helpful in those situations where it would be difficult to remove the acid from the lumen after leaching. Any acid that dries in the lumen may result in unwanted deposits of material dissolved in the acid in the lumen.

Preconditioning of the acid leaching solution occurs by addition of various silica ion producing materials and/or materials that produce at least one common ion in more than trace amounts. Quantities greater than trace amounts are those greater than around 0.3 percent on a dry basis. The forms of the ion producing materials added to the acid are those that result in the solubilization of the ions into the acid solution. For instance, in an acid solution or dispersion that is above the saturation limit with silica without the presence of a common ion, the excess silica can precipitate and may act as an abrasive that decreases the tensile strength and abrasion resistance of the resultant porous silica-rich shape. Preferably the amount of silica or silica complexes in the acid solution is around the saturation amount. The silica complexes include silica and complexes of silica, oxygen and other metallic cations or oxides. It is also possible to use an acid solution with silica in an amount above its saturation value along with at least one common ion. Also, the silica ion producing compound and the common ion producing compound can be added to the acid as one compound producing both or as separate compounds producing each type of ion individually. In the former case the sole compound can be glass compositions similar to or different from the glass composition of the precursors being leached. In this vein the acid solution is actually used to preleach a glass composition to provide the silica ion and at least one other common ion. This also occurs in using used-acid solution or in recirculating used-acid solution to leach additional samples of glass precursors. The degree of preconditioning need not be 100 percent as long as it is substantial leaching of the glass shapes to obtain the desired concentration of ions in the preconditioned acid. In the situations of preleaching or of recycling of leaching solution, the normality of the acid solution can be maintained through the addition of some fresh acid.

Nonexclusive examples of at least one common ion present in the acid leaching solution when a material such as an oxide having a cation is also present in the glass being leached includes: alkali metal ion, alkaline earth metal ions and metal ions such as beryllium, zinc, strontium, cadmium, aluminum, titanium, zirconium and thorium and the like. In addition to adding compounds that produce the aforementioned free ions, compounds can be added to the acid solution which also produced complexes of the aforementioned ions together or with other ions for example, silicates of the aforementioned ions can be added to the acid leaching solution. The conjugate acid-base salts are examples of compounds useful in providing the desired ions.

In addition, the leaching with preconditioned acid can involve successive preconditioned acid leaches. For instance the glass precursors can be leached with a preconditioned acid having the silica and at least one common ion. Subsequent to this first leaching, the leached glass, with or without water rinse, encounters a second preconditioned leach where the preconditioning can be just the presence of the silica ion with the acid or the presence of the silica ion with a common ion other than that in the first preconditioned leach. Conditions of the successive preconditioned leach are similar to that of the first preconditioned leach including the amount of ions from around saturation up to acid solutions with the ions contents above their saturation value. By successive leaching with such preconditioned acids, the leachability of the particular component in the glass having that common ion can be greatly reduced or eliminated while the remaining acid soluble components can be nearly completely or completely removed. By choosing the right preconditioning ions for a given glass composition of the precursor, the production of a porous, silica-rich shape results while substantially reducing the shrinkage of the leached layer and avoiding high stress build up. Successive leaching with preconditioned acids may also avoid the occurrence of cracks and broken elongated shapes during leaching. In addition, control and variation of pore size, pore volume and surface area of the porous silica-rich shape may be achieved. One nonexclusive example of successive leaching is first leaching "E-glass" with a saturated solution of $SiO_2$ and aluminum oxide in hydrochloric acid. During this first preconditioned acid leach the stress development is maintained below that which occurs in leaching with fresh acid. After the boron oxide and calcium oxide are removed from the glass shape in this first preconditioned acid leach, the shape would be porous, and internal stresses would return to a low level. The resulting shape can be leached a second time in an acid preconditioned in a different way. For example, one way is to have the second preconditioned acid containing only silica ion in a saturated amount in the acid. This would remove the aluminum oxide not removed in the first preconditioned acid leach and cause some recurrence of stress during this second stage of leaching. However, such stress would not be additive to the stress occurring in the first stage of leaching. The stress developed will still be very low and below the critical stress thereby reducing the number of broken elongated shapes. In successive preconditioned acid leaching the amount of the common ion present in the first leach can range from less than saturated to saturated. If the latter amount is used, the second leach could remove any acid extractable common ion material left in the porous material of the first leach because of the presence of the saturated common ion. Alternatively, for controlled leaching, it is possible to Perform only the first preconditioned acid leach with the amount of the common ion ranging from greater than zero up to the amount of saturation.

Preconditioned acid leaching is conducted in the aforedescribed manner but more preferably with a normality in the range of about 0.1 to about 6 and most preferably, about 3 to 4 Normal for hydrochloric acid. The temperature is in the range of around 50° C. to 100° C., preferably 60° C., for about 10 minutes to about 96 hours, preferably about 24 to about 72 hours for the preferred composition and fiber diameter. The glass precursors are immersed in the preconditioned acid bath for a sufficient period of time, at a sufficient temperature to remove a substantial amount, if not all, of the acid soluble compounds except for any material remaining because of the presence of a saturated amount of common ion in the leach bath. The glass shapes can be submerged in the acid when the acid is cool and the temperature of the acid is increased to the elevated temperature, or can be submerged in acid at an elevated temperature. In the first approach the temperature of the cool acid is not too low to cause irreversible precipitate formation. Nonexclusive examples of other suitable dilute solutions of acids include: sulfuric, nitric acid, or organic acids such as oxalic acid for non-calcium-containing glasses. The volume ratio of acid to glass precursor in the preconditioned acid leaching step can be about 1 to about 2500 or more volumes of acid to one volume of glass precursor, and this will vary somewhat with the normality of the acid. Higher volume ratios can be used in continuous or batch operations, where the acid is reused. The porous, silica-rich shapes are removed from the acid leaching solution, water washed to a pH of around 5 to neutral in the wash water after which the shapes are dried, preferably by air drying for around 10 minutes to about 24 hours or more but alternatively oven-dried at elevated temperatures. Also, the shapes that are to be maintained as porous shapes may be dried after air drying at elevated temperatures up to 200° C. or more but such temperatures are less than those that would detrimentally affect the pores of the fibers. If the maintenance of pores in the shapes is not a concern, the shapes can be heated to consolidate them for various uses such as fiber optics or formation of high temperature materials.

The resulting porous shapes have a mean pore diameter that can be controlled to be in the range of greater than 0 to about 300 angstroms from the various aforementioned compositions and preconditioned extraction operations. The porous shapes have a pore volume in the range of about 0.15 to about 1.5. The diameters from about 10 microns to about 250 microns and capillary and tube diameters up to around 5 mm, and the lengths from those of beads or chopped fibers to 20 feet or more can have some shrinkage on the order of less than around 2.5 percent.

When the porous shapes of the present invention are hollow, porous, silica-rich fibers or tubes, they are useful for gas and/or liquid separations in any gas and/or liquid separating apparatus known to those skilled in the art. For example, the gas separation apparatus utilized by those skilled in the art for separating gases with the use of hollow polymeric fibers can also be used with the porous, hollow, silica-rich fibers of the present invention. Any of these apparatus that provide contact between a gaseous mixture and either the exterior surface or the lumen of at least one of the hollow, porous, silica-rich fibers and that provide for separate removal of the gaseous mixture and the permeate (separated gas) can be used. Removal of the permeate is from the opposite side of the fiber from which the gaseous mixture contacted the hollow, porous fiber. An example of an apparatus that can be used is that shown in the article entitled "Helium and Diffusion Separation", by K. B.

McAfee, Jr., Bell laboratories Record, Vol. 39, pg. 358, October, 1961, hereby incorporated by reference. Also, the porous shapes are useful in fiber optic cable production; cell and/or biochemical, chemical, or catalyst immobilization; and high silica shape production with or without consolidation.

Preferred Embodiment of the Invention

The preferred glass forming, fiberizable, pore generating batch composition is formulated by back calculations to result in a shape of hollow glass fiber composition that is not phase-separated before leaching of the acid extractable components. It is also preferred that the glass fibers have zirconium oxide or titanium oxide balanced with some aluminum oxide in an alkali metal borosilicate fiber glass composition to result in hollow porous fibers with good alkaline tolerance.

The batch for forming glass fibers most preferably provides hollow fibers with a phase-separable glass composition, however, the fibers are formed so they are not phase-separated. The hollow glass fibers are formed by melting the batch at about 2600° F. (1427° C.) for around 3 hours and conditioning the melt for around one hour at 2600° F. (1427° C.), and mechanically attenuating the hollow glass fibers into air at ambient temperatures from a single-tip hollow fiber bushing melter, preferably an extended tip or a flared tip bushing. The air flow to the hollow fiber bushing is satisfactory to result in the desired K factor (inside diameter/outside diameter) of around 0.2 to around 0.9. For a single-tip bushing the air flow usually is in the range of greater than 0 to about $1 \times 10^{-4}$ cfm (cubic feet per minute). The attenuation speeds are preferably from around 1,500 to around 6,000 feet/min. or more. The hollow fibers formed with good concentricity have a diameter in the range of about 3 microns to about 250 microns and most preferably about 10 microns to about 70 microns and have a wall thickness of around 1 to about 30 microns most preferably 1 to 5 microns. The hollow glass fibers preferably are formed with the application of an aqueous chemical treating composition (sizing). Preferably the size has a substantial amount of water (deionized) and a polyurethane film forming polymeric emulsion in an effective film forming amount, polyoxyalkylene polyol with a molecular weight of around 7,000, glass fiber wet lubricant in such an effective amount, a silylated polyether lubricant, in an effective lubricating and coupling amount and a mixture of ureido organosilane and epoxy organosilane coupling agents in effective coupling agent amounts. The fiber is wound into a cylindrical forming package having a porous substrate secured around the circumference of the forming tube as disclosed in U.S. Pat. No. 4,689,255, hereby incorporated by reference.

Preferably, the production of hollow glass fibers of the instant invention results in good concentricity of the central lumen of the fibers for two basic reasons.

First, the bushing tip is firmly affixed to the faceplate of the bushing. The aligned tube through which the gases are introduced to provide the central lumen of the glass fibers as they are being formed is also rigidly affixed to the bushing faceplate through a bracket member which forms a truss that prevents the tube from moving in any direction with respect to the faceplate itself. Thus, any warping of the faceplate during operation and consequent movement of the bushing tips carries with it an associated similar movement of the tube or conduit so that the gas introduced through the gas tube is always being introduced to the molten glass emanating from channels in the bushing tip at the same location. The established lumen of the resulting fibers is thus readily maintained at its formed diameter as is the outside diameter of the fiber. This provides for uniform K values obtained in the fibers.

Secondly, it has been found in some cases that by introducing the air stream into the glass at the exit point of the tip and at a larger diameter than heretofore used, characteristic bulging of the cone of the molten glass may be avoided. Further, a more stable attenuation process is achieved, and uniform concentric holes are provided in the glass fibers formed as the molten glass emanates from the bushing tip. This occurs because the diameters of the air stream and glass stream at the tip are in approximately the same proportion as the desired end product. Once again, the lumen is centrally located and is constantly in the same position (regardless of whether or not the bushing faceplate distorts) due to the firm connection between the bracket member, the bushing faceplate and the tube. Glass can flow freely into an area above the bushing tips in all instances, where the tubes are being held, since the bracket member is completely open in between the spaces between tabs and also through the holes located in the top of the bracket member. Welds between the tube and the bracket member and the solid connection or button formed by the side arm tabs of the brackets in the hole provided in the faceplate for the tabs provide a rigid, secure, truss-type attachment so that there is no movement of the tubes when faceplate distorts over time.

The completed forming package has the fibers or strands (gathered fibers) glued to the substrate, and the fibers and substrate are cut parallel to the longitudinal axis of the package. All of the layers of glass fibers with the substrate can be removed from the package. These fibers with the substrate are laid straight on a support in any suitable container for holding solids and fluids, where the fibers usually have a discrete length of about 12 inches (30.5 cm).

For acid leaching the non-phase-separated, hollow glass fibers are end-sealed with silicone rubber thinned in toluene and air cured for around 24 hours. The end-sealing reduces the possibility of precipitate formation during leaching in lumens of the hollow fibers. Alternatively, the fibers could be heat-sealed or end-sealed with epoxy resin or other suitable material. A plurality of the blankets (layers of fibers and substrate cut from the winder) is contained in a suitable rack to hold the fibers in the acid while allowing for agitation of the acid solution. The rack is placed in an acid solution in an appropriate vessel. The fibers are leached with agitation, by a preconditioned acid solution of about 3 to 4 Normal hydrochloric acid, at temperatures around 50° C. to 70° C., for about 4 to about 96 hours, and most preferably about 12 to about 72 hours. Preconditioning of the acid solution involves leaching already formed glass fibers in an amount in the range of greater than 0.1 to over 100 gm of glass/liter of acid and most preferably around 10 to 30 gm/liter with the concentrated acid. Performance of preconditioning is at a temperature in the range of around 50 to 70° C. for a time of around 6 to 48 hours. The acid is preconditioned at the same temperature at which the subsequent leaching is performed, and this temperature of preconditioning is maintained throughout preconditioning. When larger amounts of glass fibers are used, shorter times are employable. The preconditioned acid is separated from any remaining leached glass fibers, and the preconditioned acid with a normality of around 3 to 4 is used to leach hollow glass fibers. In a continuous process the continuous performance of preconditioning of the acid may occur automatically after initial preconditioning. In such a process, preconditioning can be performed at the beginning of the process and that preconditioned acid can be subsequently recycled for subsequent leaching operations.

In the acid leach, the hollow glass fibers are immersed in the preconditioned 3 to 4 normal hydrochloric acid bath for a sufficient period of time, at the elevated temperature of acid preconditioning to remove a substantial amount, if not all, of the hydrochloric acid soluble compounds in the glass fibers. This near complete or complete removal is achieved since the amounts of the plurality of common ions present in the acid leaching solution are in amounts less than saturation values for each common ion. The volume ratio of acid to glass fibers in the acid leaching step is about 100 to about 2500 volumes of acid to about one volume of hollow glass fibers but this ratio will vary somewhat with the normality of the acid. The hollow, silica-rich fibers are removed from the acid leaching solution, and they are water washed to a pH of around 5. Afterwards, the fibers are dried, preferably by air drying at ambient temperature for around 8 hours to about 24 hours. In addition, the fibers can be further dried by techniques known to those skilled in the art to result in uniform drying.

A plurality of the porous, hollow, silica-rich fibers are placed in a pressurizable container having an inlet and two outlets. One end of each fiber at the same side of the container is sealed. The unsealed side of each fiber is located in one of the outlets of the container. This allows for flow of the gaseous mixture into the container so that the permeate passes through and exits the porous hollow fibers and exits the container via the appropriate outlet of the container. The unseparated gaseous mixture exits the container at the other outlet and can be recirculated to the inlet.

The invention along with alternative embodiments are illustrated further in the following examples.

Example 1

Preconditioned acid was made using 4 Normal hydrochloric acid by heating 1.5 liters of the acid in a two-liter beaker to 60° C. with stirring. One and a half grams of glass fibers having the composition with components in weight percent of: silica dioxide 59.4, $B_2O_3$ 27, $Na_2O$ 8.8, $ZrO_2$ 3.6, $Al_2O_3$ 0.8, $Fe_2O_3$ 0.3, and trace materials of 0.1 were combined in the form of hollow fibers having an OD ID of 45/35 (microns) with the acid. The trace materials in the formulation include such oxides as magnesium oxide, titanium dioxide, potassium oxide, chromium oxide, strontium oxide and barium oxide and the trace materials also include fluorine. A plurality of the hollow fibers were end sealed with an epoxy resin with air curing for approximately 2 hours. The plurality of fibers were enclosed in a polyester mat (Reemay No. 2238) by heat sealing to form a bag.

Prior to preleaching, one milliliter of acid was removed from the warm acid and diluted to 100 milliliters to provide an initial silica assay for the acid. The packet of fibers was placed in the 4 Normal hydrochloric acid at 61° C. at a ratio of 1 gram of fibers for 1 liter of acid. The fibers were pulled out of the acid after 4.6 hours of leaching at a temperature of approximately 62° C. A 1 ml sample of the acid after the fibers were removed was taken and was diluted to 100 milliliters with deionized water at room temperature. The fibers that were removed were soaked twice for 10 minutes per soak in deionized water. The first soak had an initial pH of 5 and a final pH of 3. The second soak had an initial pH of 5 and a final pH of 4. The fibers were yellow in color but became clear within minutes of the first soak. The fibers were dried and inspected and were found to be very weak and brittle. A binder or size was not originally on the fibers before leaching. These fibers represent examples of fibers leached in fresh acid.

The same aforementioned acid underwent additional preconditioning in the following manner. Another bag of the fibers was prepared in the same manner as the previous bag and it was added to the acid where the fiber weight was 13.5 grams to give a total of 10 grams per liter of preconditioning. This includes the 1 gram per liter from the first leaching. The fibers were removed from the acid after 22.25 hours of leaching at approximately 60° C.

This acid that was preconditioned to the extent of 10 grams per liter was used to leach another bag of hollow fibers of the same composition at 60° C. The fibers were removed after 23.2 hours and soaked in the two-step water soaking and one milliliter (ml) of the acid diluted to 100 milliliters with deionized water was taken. The fibers were air dried and inspected and they appeared intact and very much stronger and less brittle than the original sample of fibers leached in fresh acid and used to initially precondition the acid.

Example 2

A silica-preconditioned solution was prepared in the following manner. Twelve drops of Nalcoag 1034-A (a commercially available colloidal silica with 34 weight percent silica in an aqueous solution at pH3) were added to 2 liters of deionized water. The pH of this solution was adjusted to about pH 11 with 1N NaOH. This pH 11 solution was heated to 60° C. and maintained at 60° C. for 48 hours. The 2 liters of pH 11, silica preconditioned solution was mixed with 2 liters of 8N HCl which was also heated to 60° C., to form 4 liters of 4N HCl preconditioned with silica. A one ml sample of the preconditioned acid was taken and diluted to 100 ml with deionized water. A spectrophometric test available from Bausch & Lomb (Spectrakit Reagent System for Silica-Low Range, Catalog No. 330924) was performed on the dilute sample. The test result indicated a silica concentration of 55 ppm in the preconditioned acid.

Table 1 lists tensile strengths and abrasion resistances for strands of fibers leached in four different preconditioned acid solutions. The silica concentrations of the leaching solutions were determined by taking one milliliter samples of the solution and diluting each sample to 100 milliliters with deionized water. These diluted samples were analyzed using the aforedescribed spectrakit spectrophotometric method.

All the fiber strands were obtained from one continuous strand wound about the same forming package. The strands contained 110 fibers that were of the solid, "E-glass" type where the fibers were about 10 microns in diameter. The fibers were formed with the application of the aqueous chemical sizing of the preferred embodiment at a LOI of about 1.9%, and were wound onto a cylindrical forming package having cardboard tube. The forming package was dried for 12 hours at 240° F. (115.5° C).

Samples were prepared by cutting strands of fibers to a length of about 30 cm, laying these lengths on a sheet of Mylar plastic, and tabbing the strands with Devcon ® 5-minute epoxy. Two epoxy tabs were provided on each strand at a distance apart so as to give a sample gage length of about 18 cm. The tabs were allowed to air cure for about 24 hours. The tabbed strands were sandwiched in layers of Reemay polyester mat and the mat was secured with plastic clips (packet), to reduce entanglement of the samples during leaching and rinsing.

The four leaching solutions were prepared in the following manners:

Solution A - Three and one half liters of 4N HCl was heated to 60° C. in a covered beaker. Thirty-five grams of "E-glass" type fibers (10 um diameter, solid) were heat sealed in a porous polyester mat bag and were added to the 60° C. acid and allowed to leach for about 9 days. The acid was maintained at 60° C. at all times.

Solution B - Prepared as per Example 2, i.e., 3 drops of Nalcoag 1034-A per liter of final acid.

Solution C - Prepared as per Example 2, except used 11 drops of Nalcoag 1034-A per liter of final acid.

Solution D - Prepared as per Example 2, except used 1 drop of Nalcoag 1034-A per liter of final acid.

Each four sets of packets of fiber strands were leached, one set for each leaching solution A through D, in the following manner: 1.5 liters of the leaching solution of interest (at 60° C.) was poured into a polyethylene tray. A unit of tabbed strands sandwiched between layers of porous polyester mat, with the mat held secure with plastic clips, was added to the leaching solution. A PVC bar was placed over the strand/mat unit (packet) to keep the unit immersed in the acid. The tray was securely covered and placed immediately into a 60° C. bath. The strands were leached for between 95 and 96 hours, without agitation, at 60° C. The packet was removed from the leaching solution and soaked twice, for 10 minutes each soak, in 2 liters of room temperature deionized water. The strands were then air dried.

Tensile testing of the strands was performed in accordance with a modified ASTM method D 2343, "Standard Test Method for Tensile Properties of Glass Fiber Strands, Yarns, and Rovings Used in Reinforced Plastics". Deviations from this standard method were as follows: (1) sample gage length was about 18 cm, (2) fibers were not impregnated as per the standard; the only fiber coating was the aqueous chemical sizing applied during forming, and (3) the fiber tabs were prepared as described herein, and not as described in the standard method.

The abrasion resistance test was performed in a manner similar to that described in "Philco-Ford Test: U.S. Department of the Interior, September 1973, R&D report No. 884, Section 3.1.1. The parameters of the test were (1) a ¼ inch diameter, stainless steel contact bar, (2) an oscillation rate of about 30 cycles/minute, (3) a stroke distance of 2¼ inches, (4) an angle of incidence of about 37 degrees, and (5) a strand loading of about 30 grams. The strand samples were air dried for about 4 days before testing.

TABLE 1

| Examples | | Before Trial $SiO_2$ ppm | After Trial $SiO_2$ ppm | Tensile Strength psi | Abrasion Resistance Cycles | Leach Time (Hours) |
|---|---|---|---|---|---|---|
| A | Glass Precon. (other ions) 10 g glass/liter acid | 61 | 63 | 29,000 | 4,000 | 95 |
| B | Silica (saturated) | 55 | 59 | 22,000 | 1,400 | 95.5 |
| C | Silica (above saturation) | 213 | 120 | 0* | 0* | 96 |
| D | Silica (below saturation) | 16 | 48 | 0* | 0* | 95.3 |

*Fibers too weak to perform physical testing. Leaching done in 4N HCl, 60° C., 0.15 g of sample/liter of leach solution.

From Table 1 it is clear that leaching glass fibers with acids having saturated silica give improved strength and abrasion over those obtained by leaching with acid solutions containing silica in amounts less than saturation. Also, the saturated silica preconditioned leaching is better than the above saturation precondition leaching. Also, Table 1 shows that leaching with acids preconditioned with silica and with a plurality of common ions in an amount of less than saturation for each common ion gives better strength and abrasion results over leaching with acid solution having only silica ion.

We claim:

1. Porous silica-rich glass shapes having improved strength and abrasion resistance, comprising:
   (a) about 70 to about 99 weight percent silica, while also having a pore volume from 0.15 to 1.5 cc/gram, lengths from less than an inch to near continuous lengths, and diameters from 3 microns to 5 millimeters produced from glass precursors having a similar length and diameter and having in weight percent of the glass precursor: silica in an amount in the range from 30 to 75 weight percent, acid extractable components that are extractable with acids other than hydrofluoric acid in an amount of around 10 to 60 volume percent, where the shapes are acid leached in a preconditioned acid that is an acid other than hydrofluoric acid where preconditioning involves having ions present in the acid solution where the ions are ions of silica at nearly saturated levels and at least one additional ion that is common to material present in the glass shape being leached,
   (b) a minor amount of unextracted nonsiliceous components.

2. Porous, silica-rich shape of claim 1, wherein the acid extractable components include: one or more boron-containing materials, alkali metal oxides, alkaline earth metal oxides, trivalent oxides and oxides selected from the group consisting of zirconium dioxide, titanium dioxide, tin oxide and phosphorus oxides.

3. Porous, silica-rich shape of claim 1, wherein the shape that has a pore volume in the upper part of the range of 0.15 to 1.5 cc/gm has an amount of silica present that results from leaching glass precursor shapes that were heat treated and phase separated glass precursor shapes where heat treating was in the range of 400° to 600° C.

4. Porous, silica-rich shapes of claim 3, wherein the glass precursor has a borosilicate alkali metal ternary glass composition having 20-35 weight percent $B_2O_3$, 4-12 weight percent alkali metal oxide and silica in an amount not less than 56 and not more than 75 weight percent and aluminum oxide present in an amount of not more than around 12 weight percent.

5. Porous silica-rich shapes of claim 1, wherein the silica rich porous shape is obtained from glass precursor shapes having the following composition in weight percent: 27 $B_2O_3$, 8 $R_2O$ where R is selected from sodium or potassium, 60 $SiO_2$, 3.6 $ZrO_2$ and 1.4 $Al_2O_3$.

6. Porous silica rich shapes of claim 1, wherein the glass composition prior to leaching has the composition weight percent as follows: 52-56 silica, 5-8 boric oxide, 22-24 calcium oxide or calcium oxide and magnesium oxide, 12-15 weight percent aluminum oxide and less than 1 weight percent of each of the following: fluorine, ferric oxide and sodium oxide.

7. Porous silica rich shape of claim 1, wherein the shapes are selected from the group consisting of fibers, hollow fibers, rods, tubes, capillaries, plates, hollow spheres and beads.

8. Porous silica rich shapes of claim 1, wherein the amount of silica ion present in the acid leaching solution is in an amount from at least around saturation for silica ion up to and including above saturation for silica ion.

9. Porous silica-rich shapes of claim 1, wherein the amount of common ion present in the acid leaching solution is in an amount less than the saturation amount for each common ion.

10. Porous silica-rich shape of claim 1, wherein the preconditioned acid for leaching that is comprised of silica ion and at least one common ion is prepared by acid preleaching glass precursors that have a composition of silica and at least one other material comprising the common ion that is the same as that common ion to be placed in the leaching solution.

11. Porous silica-rich shapes of claim 1, which includes a minor amount of a metal oxide selected from the group consisting of zirconium dioxide and titanium dioxide and mixtures thereof.

12. Porous silica-rich shape of claim 11, wherein the minor amount of said metal oxide is in the range from around 1 to around 15 weight percent of the porous silica-rich shape.

13. Porous silica-rich glass shapes of claim 1, which after leaching with preconditioned acid have been subjected to a second leaching with preconditioned acid where the second preconditioned acid has ions selected from the group consisting of silica and common ions other than those present in the first preconditioned acid leach and mixtures thereof.

14. Porous silica-rich glass shapes of claim 1 that have the form of fibers, hollow fibers, rods, tubes and capillaries having improved strength and abrasion resistance by substantially reducing shrinkage and avoiding high stress build up thereby avoiding occurrence of cracks and broken shapes through the leaching with a preconditioned acid.

15. Porous silica-rich glass shapes of claim 1, wherein the preconditioned acid has ions of silica selected from the group consisting of silica, and silica complexes including complexes of silica, oxygen and other metallic cations or oxides.

16. Porous silica-rich glass shapes of claim 1, wherein the preconditioned acid has common ion selected from the group consisting of: alkali metal ion, alkaline earth metal ions, metal ions such as beryllium, zinc, strontium, cadmium, aluminum, titanium, zirconium or thorium, and complexes of these ions with other ions including silicates and conjugate acid-based salts and other ions that are common to a cation or ion complex in the precursor glass shape.

17. Porous silica-rich glass fibers having improved strength and abrasion resistance, comprising:
(a) about 70 to about 90 weight percent silica which also have a pore volume from 0.15 to 1.5 cc/gram, and a length less than 1 inch to near continuous lengths, and produced from precursor glass fibers selected from the group consisting of hollow and solid glass fibers of similar length and mixtures thereof, where the precursor glass fibers have in weight percent an amount of silica in the range of 30 to 75 and an amount of acid extractable components selected from the group consisting of boron-containing materials, alkali metal oxides, boron oxides, alkaline earth metal oxides, trivalent oxides like aluminum oxide and ferric oxide, and oxides such as titanium dioxide, tin oxide and phosphorus oxides and zirconium oxide and mixtures thereof in an amount of from around 10 to 60 percent where the precursor glass fiber is leached in preconditioned acid that is other than hydrofluoric acid and that has silica ion in an amount of at least around saturation for silica ion and an amount of at least one nonsiliceous ion that is common to at least one material in the precursor glass fiber other than silica from greater than zero to saturated amounts for each common ion, and
(b) a minor amount of unextracted nonsiliceous material.

18. Silica-rich fibers of claim 17, wherein the precursor glass fibers have a phase separable composition and are heat treated for phase separation at a temperature from 400° to 600° C. prior to leaching.

19. Silica-rich fibers of claim 17, wherein the precursor glass fibers have a composition selected from the group consisting of (a) 20 to 35 weight percent $B_2O_3$, 4 to 12 weight percent alkali metal oxide, silica in an amount of not less than 56 to not more than 75 weight percent, aluminum oxide from 0 to 12 weight percent, zirconium oxide from an amount of 0 to 8 weight percent, (b) silica 52 to 56 weight percent, boric oxide 5-8 weight percent, greater than 22 to about 24 weight percent calcium oxide or calcium oxide and magnesium oxide, 11 to 15 weight percent aluminum oxide, 0-5 weight percent zirconium oxide and less than 1 weight percent of each of the following: fluorine, ferric oxide and sodium oxide.

20. Porous silica-rich fibers of claim 17, wherein the preconditioned acid leaching solution has silica and at least one common ion where both are present by preleaching glass shapes where the glass composition of the shapes has at least silica and at least one material containing the common ion to be placed in the leaching solution.

21. Porous silica-rich fiber of claim 20, wherein the acid preleaching is conducted at a temperature from ambient to around 100° C. for a period of time to give a degree of leaching from about 50 to 100 percent to provide a sufficient amount of silica and the common ion.

22. Porous silica-rich fibers of claim 17, wherein the amount of common ion present in the acid leaching solution is in an amount less than the saturation amount for each common ion.

23. Porous silica-rich fibers of claim 17 wherein the minor amount of unextracted nonsiliceous material includes metal oxides of zirconium and titanium and mixtures thereof.

24. Porous silica-rich fibers of claim 23, wherein the minor amount of said metal oxide is in the range from around 1 to around 15 weight percent of the porous silica-rich shape.

25. Porous silica-rich glass fibers of claim 17, wherein the shapes after leaching in the preconditioned acid have been subjected to a second leaching with preconditioned acid having ions selected from the group consisting of silica and common ions other than those present in the first preconditioned acid leach and mixtures thereof.

26. Porous silica-rich glass fibers of claim 17, wherein the preconditioned acid has silica ions selected from the group consisting of silica and silica complexes including complexes of silica, oxygen and other metallic cations or oxides.

27. Porous silica-rich glass fibers of claim 17, wherein the preconditioned acid has at least one common ion selected from the group consisting of alkali metal ion, alkaline earth metal ions and metal ions including beryllium, zinc, strontium, cadmium, aluminum, titanium, zirconium and thorium and complexes of these ions with other ions including silicates and conjugate acid-based salts, and other ions that are common to a cation or ion complex for the precursor glass fiber.

* * * * *